United States Patent
Andre (10) Patent No.: US 9,586,483 B2
(45) Date of Patent: Mar. 7, 2017

(54) ELECTRIC POWER SUPPLY ASSEMBLY WITH ASSISTED ESTABLISHMENT OF ELECTRICAL CONTACT WITH A POWER-COLLECTING TRACK CARRIED BY AN ELECTRICALLY POWERED VEHICLE

(71) Applicant: NewTL, Ernolsheim (FR)

(72) Inventor: Jean-Luc Andre, Molsheim (FR)

(73) Assignee: NewTL (FR)

( * ) Notice: Subject to any disclaimer, the term of this patent is extended or adjusted under 35 U.S.C. 154(b) by 248 days.

(21) Appl. No.: 14/349,537

(22) PCT Filed: Oct. 8, 2012

(86) PCT No.: PCT/IB2012/055434
§ 371 (c)(1),
(2) Date: Apr. 3, 2014

(87) PCT Pub. No.: WO2013/050991
PCT Pub. Date: Apr. 11, 2013

(65) Prior Publication Data
US 2014/0262662 A1    Sep. 18, 2014

(30) Foreign Application Priority Data

Oct. 6, 2011  (FR) ...................... 11 59049

(51) Int. Cl.
*B60L 5/42* (2006.01)
*B60M 1/36* (2006.01)
(Continued)

(52) U.S. Cl.
CPC ............. *B60L 5/42* (2013.01); *B60L 11/1837* (2013.01); *B60M 1/36* (2013.01); *B60L 5/06* (2013.01);
(Continued)

(58) Field of Classification Search
CPC ...... B60L 5/04; B60L 5/06; B60L 5/08; B60L 5/18; B60L 5/19; B60L 5/42
See application file for complete search history.

(56) References Cited

U.S. PATENT DOCUMENTS 8,232,671 B2* 7/2012 Andre ...................... B60L 5/42
                                                        180/2.1
8,324,858 B2* 12/2012 Hill .......................... B60L 5/42
                                                        104/34
(Continued)

FOREIGN PATENT DOCUMENTS

FR    2942750 A1    9/2010
FR    2957861 A1    9/2011
(Continued)

*Primary Examiner* — Zachary Kuhfuss
(74) *Attorney, Agent, or Firm* — St Onge Steward Johnson and Reens LLC (57) ABSTRACT

An electrical power supply system with assistance with the making of electrical contact, of a type having a power supply arm mounted on a post positioned alongside the road, entering into electrical contact with a longitudinal conductor rail carried on the vehicle, is characterized in that the arm has—at its end—a means of rolling or sliding that enters into moving contact with an adjacent lane alongside the conductor rail at the beginning of its length. This invention concerns the domain of electrically-propelled vehicles carrying at least one longitudinal power supply rail.

18 Claims, 5 Drawing Sheets

(51) Int. Cl.
*B60L 11/18* (2006.01)
*B60L 5/06* (2006.01)

(52) U.S. Cl.
CPC ........ *B60L 2200/26* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(56) References Cited

U.S. PATENT DOCUMENTS

| | | | | |
|---|---|---|---|---|
| 8,678,150 B2* | 3/2014 | Andre | ........................ | B60L 5/42 |
| | | | | 191/33 R |
| 8,820,500 B2* | 9/2014 | Andre | ........................ | B60L 5/42 |
| | | | | 191/47 |
| 8,829,853 B2* | 9/2014 | Hill | ........................ | B60L 5/42 |
| | | | | 104/34 |
| 2010/0039067 A1* | 2/2010 | Hill | ........................ | B60L 5/42 |
| | | | | 320/109 |
| 2012/0111682 A1* | 5/2012 | Andre | ........................ | B60L 5/42 |
| | | | | 191/40 |
| 2012/0260818 A1* | 10/2012 | Song | ........................ | B60L 5/36 |
| | | | | 105/238.1 |
| 2013/0092492 A1* | 4/2013 | Andre | ........................ | B60L 5/42 |
| | | | | 191/47 |
| 2013/0193919 A1* | 8/2013 | Hill | ........................ | B60L 5/42 |
| | | | | 320/109 |
| 2014/0340040 A1* | 11/2014 | Hill | ........................ | B60L 5/42 |
| | | | | 320/109 |

FOREIGN PATENT DOCUMENTS

| | | | |
|---|---|---|---|
| GB | 320253 | A | 10/1929 |
| WO | 2011079215 | A2 | 6/2011 |

* cited by examiner

ELECTRIC POWER SUPPLY ASSEMBLY WITH ASSISTED ESTABLISHMENT OF ELECTRICAL CONTACT WITH A POWER-COLLECTING TRACK CARRIED BY AN ELECTRICALLY POWERED VEHICLE

FIELD OF THE INVENTION

The invention herein pertains to a means of assistance with the making of contact for an electrical power system, via a distributor arm of a vehicle carrying in its roof, or on at least one of its sides, at least one conductor rail for reception of electrical power.

BACKGROUND OF THE INVENTION

This type of electrical power supply for an electrically-propelled vehicle from a distributor arm and a conductor rail carried by the vehicle has many advantages, of which one is a saving on power cable suspended along the road, and on posts, and the fact that you only need the minimal infra-structures that allow this type of power supply, notably, for urban transport.

These advantages and benefits are lessened by the difficulties inherent in the making of contact of the power supply arm with the conductor rail carried by the vehicle.

This is because, for electrical and mechanical reasons, the making of contact of the conducting part used as shoegear of the distributor arm with the conductor rail present on the roof or side of the vehicle must be firm and without bounces, while being gentle and dampened without shock. Because the vehicle arrives under the arm at a certain speed, the advance of the ramp tends to raise it. Therefore, the fall of the arm has to be dampened, to prevent the shoegear from breaking on making contact with the conductor rail.

Similarly, once electrical contact has been established, the shoegear must not disconnect from the power supply rail, or else there will be electrical arcs that can damage it. Often, the power supply rail is not perfectly rectilinear, and the vehicle can also bounce due to rolling on the road surface. To have the best-possible electrical contact, the arm must oscillate with a dampened movement that prevents it from disconnecting in an undesired manner.

One also has to properly master the shoegear's bearing force on the conductor rail. Thus, in addition to a damper, the invention also makes provision for a load compensation spring.

WO 2011/079215, too, covers an electrical power supply unit for vehicles including lateral shoegears between which a conductor rail of the vehicle engages. These lateral shoegears have deflecting portions at the front, so as to facilitate engagement of the conductor rail. The desired height of the lateral shoegears in relation to the conductor rail is obtained and maintained by a wheel, for example, that is integral with the mounting of the lateral shoegears and that comes into contact with the roof of the vehicle. The movement of the wheel on the roof of the vehicle ensures optimal heightwise positioning of the lateral shoegears in relation to the conductor rail. This is because the wheel has to roll the whole time on the roof, throughout the duration of electrical contact between the shoegears and the conductor rail. It is sought to maintain and carry the shoegears at a constant height in relation to the roof of the vehicle, to prevent damaging wear to the underneath of the said shoegears, due to friction on the roof. Such an implementation, which is adapted specifically for the lateral shoegears, does not prevent or attenuate shocks that occur during the electrical contact between the said shoegears and the conductor rail. These shocks are non-negligible, especially for a vehicle arriving at the power supply station with a speed that can be as high as 40 kph or 50 kph.

SUMMARY OF THE INVENTION

The purpose of the present invention is to remedy the various disadvantages above, by providing a means of accompaniment of the arm elevation movement just before and during the making of contact with the conductor rail.

Another purpose of the invention is to provide a power supply system that provides the best-possible attenuation for the shocks caused during an establishment of an electrical link between a vehicle and a power distribution arm.

The purposes and objectives of the invention are accomplished by means of an electrical power system for an electrically-propelled vehicle with at least one electrical power distribution arm articulated on a post, with such posts being positioned at intervals along the road on which the vehicle is traveling; the arm is electrically connected to an electrical power supply, and is equipped with an electrical contact component used as a shoegear on a longitudinal conductor rail carried by the vehicle, characterized in that the following is provided for the arm associated with the longitudinal conductor rail carried by the vehicle:

a means of assistance with the optimal making of electrical contact between the electrical contact component of the arm and the conductor rail carried by the vehicle; this means forms part of the arm, and incorporates a temporary contact and pressure component;

a travel lane present on at least a part of the front upper section of the vehicle, adjacent to the conductor rail and extending over at least a portion of the length of the conductor rail, with the said temporary contact and pressure component bearing and moving on the said travel lane at the commencement of passing of the vehicle (1) under the arm (4), before the electrical contact component (17) bears on the said conductor rail (2).

According to one example of implementation as per the invention, the travel lane is a bearing ramp rising from the front to the rear of the vehicle. The ramp has, for example, a curved form—preferably a convex domed form.

According to one example of implementation as per the invention, the travel lane is mounted on the vehicle by means of a suspension.

According to one example of implementation as per the invention, the travel lane extends over a limited length in relation to the length of the conductor rail, to release the temporary contact and bearing component from any contact with the vehicle when optimal electrical contact is established between the electrical contact component and the conductor rail.

According to another example of implementation as per the invention, the travel lane extends over the entire length of the conductor rail, which incorporates a progressive and sufficient elevation of its upper surface to release the said travel lane from the said temporary contact and bearing component when optimal electrical contact is established between the electrical contact component and the upper contact surface of the conductor rail.

According to one example of implementation as per the invention, the arm is mounted pivoting on the post by an articulation connected to a suspension device on the arm.

According to one example of implementation as per the invention, the suspension device advantageously incorporates a load compensation spring and a damper.

The pivoting articulation of the arm on the post is offset transversally in relation to the vehicle beyond the post.

According to one example of implementation as per the invention, the contact and bearing component incorporates a rolling device such as a wheel or roller that moves along the travel lane adjacent to the conductor rail.

According to one example of implementation as per the invention, the contact and bearing component incorporates a sliding device such as a lug or shoe that slides along the travel lane adjacent to the conductor rail.

According to one example of implementation as per the invention, the temporary contact and bearing component is located at the free end of the arm.

According to one example of implementation as per the invention, the wheel or the roller is brought to roll by the arm. The wheel (or roller) is mounted, for instance, in a dampened or floating manner on the main structure of the arm.

According to one example of implementation as per the invention, the lug or shoe is mounted in a dampened or floating manner on the main structure of the arm.

According to one example of implementation as per the invention, the assembly includes two electrical distribution arms, each of which comes into contact with a conductor rail existing on each of the longitudinal sides of the roof, or on each upper part of each side of the vehicle, with each arm being connected to one polarity of the vehicle's electrical power supply.

The means of accompaniment of the making of mechanical and electrical contact therefore includes an assistance system that is notably characterized by a rolling or sliding system carried on the distribution arm.

This means of rolling or sliding enters into contact with a profiled travel lane adjacent to the conductor rail, with which the contact component of the means of rolling or sliding enters into contact and on which it rolls or slides until the making of electrical contact of the distribution arm shoegear with the conductor rail carried by the vehicle.

In the case of two electrical power lines or conductor rails carried by the vehicle—each on a longitudinal side of its roof or on each of its sides—a rail is provided adjoining each conductor rail on which the means of assistance moves, so as to provide each arm with electrical contact with one polarity of the electrical power supply.

A similar or identical rolling or sliding rail can be provided at the other end of the vehicle for the or each of the conductor rail(s), in the case of a bi-directional circulation.

One can also imagine an inclined rolling or sliding rail at the rear end of the conductor rail, in the area in which the conductor bar leaves or escapes from the conductor rail.

BRIEF DESCRIPTION OF THE DRAWINGS

Other characteristics and advantages of the invention will come to the fore in the description that follows, which is given as a non-limitative example, and is accompanied by drawings in which.

DETAILED DESCRIPTION OF THE INVENTION

Figure 1:
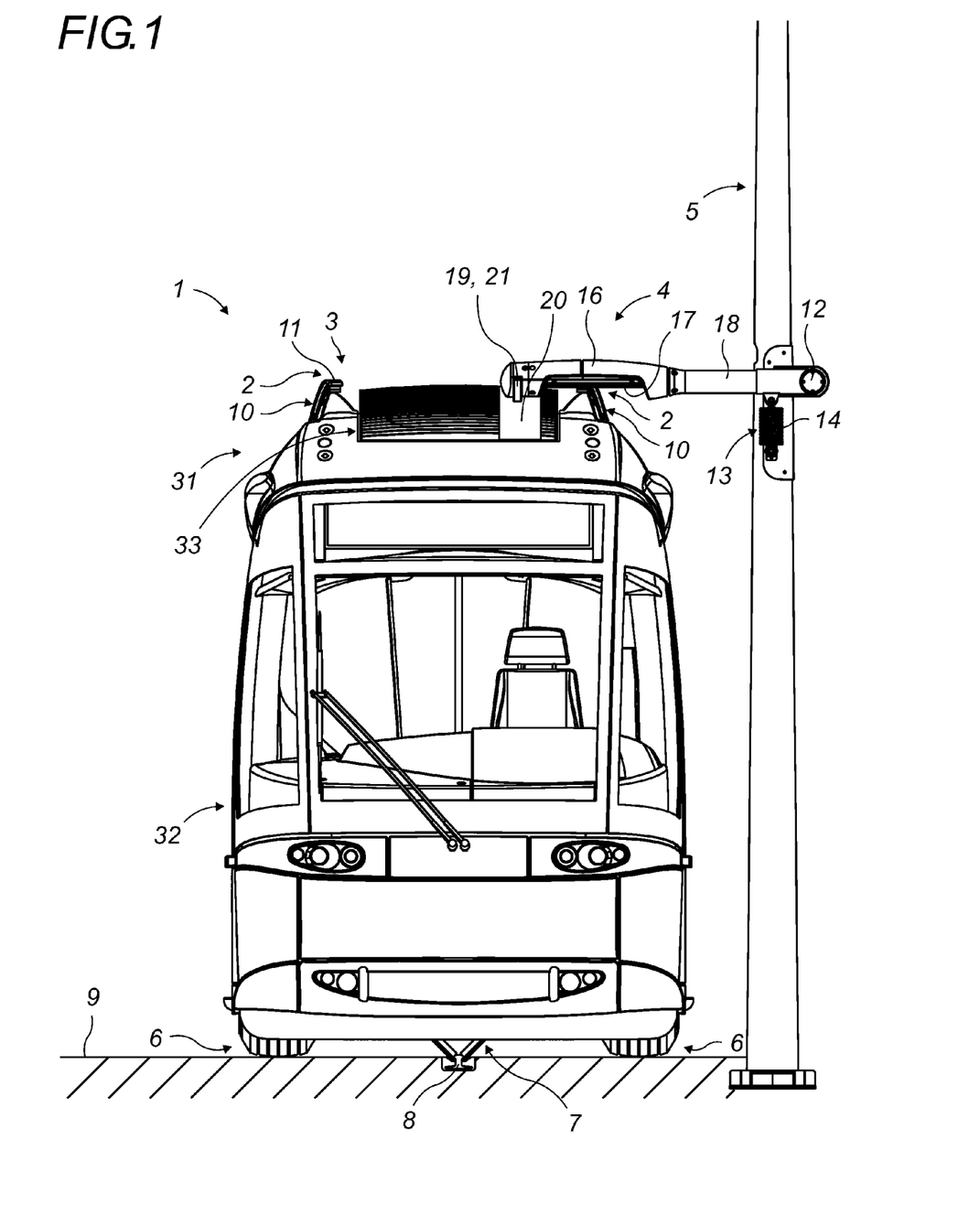
FIG. 1 is a general front view illustrating an electrically-propelled vehicle located under an electrical power supply arm mounted on a post beside the road.

As illustrated in FIG. 1, the power system according to the invention is intended to electrically power a vehicle—for example, an electrically-propelled vehicle (1) for urban transport—carrying at least one longitudinal conductor rail (2) on its roof (3) or on at least one of its sides. This rail is powered from a set of distributor arms (4), each mounted articulated on a post (5), with multiple such posts positioned at intervals alongside the road on which the vehicle (1) travels.

For reasons of simplification, reference is only made in the description below to one single arm (4).

This urban transport vehicle (1) can be of a type with tires (6) and guided by a guidance system (7) along a guide rail (8) fixed onto the ground (9).

The conductor rail (2) is preferably installed on a mounting (10) and exists over most of the length of the vehicle, which places it in an elevated position in relation to the vehicle (1) roof. It can also be located at an appropriate height on one or other of the two sides of the vehicle (1), at the end of a mounting—vertical, for example.

The conductor rail (2) has an upper surface (11) on which is mounted the electrical contact component of the arm (4) providing electrical power to the vehicle (1).

The power supply arm (4) provides electrical propulsion energy to the vehicle, but a pantograph is also provided for a conventional power supply from a catenary (not illustrated) on sections of the route that are so equipped.

The invention concerns the perfected electrical power supply system with multiple distributor arms (4) and, more particularly, the means of accompaniment or assistance of the distributor arm (4) during the making of contact with the conductor rail (2) intended for it on the vehicle (1).

The distributor arm (4) is mounted pivoting on the post (5) by means of a pivoting articulation (12).

In the implementation represented and given as an example, the pivoting articulation (12) is offset in relation to the post (5), transversally beyond the vehicle, so as to minimize the amplitude of angular deviation movements at the end of the arm. The same effect can be obtained by a post (5) more distant transversally from the vehicle. The aim is to reduce the angular deviations at the end of the arm.

The means of assistance with optimal making of electrical contact for the power system according to the invention includes, for example, additional elements.

Thus, the articulated distributor arm (4) pivoting on the post (5) is mounted on a suspension device (13) including a load compensation spring (14) and a damper (15). The characteristics of the spring (14) are designed to relieve the weight from the arm so that the pressure of the shoegear on the conductor rail (2) is not too high, which would lead to early wear. Within the spring (14) is housed the damper (15)—for example, hydraulic, telescopic and dual effect. The damper (15) is adjusted so as not to excessively dampen and brake the arm (4) during its lifting during the making contact of the means of assistance with its travel lane on which it is carried. It is adjusted to dampen the descent of the arm onto the conductor rail (2). This behavior is similar to that of a car axle on a road with potholes.

The damper (15)—like the compensation spring (14)—can be implemented in other forms—for instance, as a dry friction damper, a torsion spring or other system. This suspension device (13) is also used to maintain a firm contact that prevents bouncing between the shoegear and the power supply rail during movement of the vehicle.

The distributor arm (4) incorporates a main part protected by a fairing (16) open towards the bottom to allow the disengagement of a bar-form conducting part (17) (also called a shoegear), used as a shoegear for mechanical and electrical contact with the upper part of the conductor rail (2) and the sliding movement along it, in view of transferring electrical power. The shoegear (17) is preferably mounted pivoting and dampened around a longitudinal shaft of the arm (4).

The distributor arm (4) continues towards its articulation (12) with the post (5) by means of a tail (18).

According to the invention, the front end of the arm (4) incorporates a temporary contact and bearing component (19) participating in the making of contact, in the form of a means of rolling or sliding moving on an adjacent travel lane (20). In the case of a rolling system, it can be, for example, a wheel or a roller (21) that forms a temporary rolling bearing medium just before and during the making of mechanical and electrical contact of the electrical distribution shoegear (17) with the part or upper surface of the conductor rail (2).

In the case of a sliding system (not illustrated), it can be a lug or a shoe, or any other equivalent sliding component advancing by sliding along a suitable travel lane (20) adjacent to the conductor rail (2).

As illustrated in the Figures, the means of rolling or sliding is provided at the end of the distributor arm (4).

In the case of the illustrated variant, the roller (21) is mounted on a hub (22) by means of a roller bearing (23) carried by a mechanical assembly (24) at the free end (25) of the arm. This end (25) of the arm (4) is protected by an end cover (26).

Figure 7:
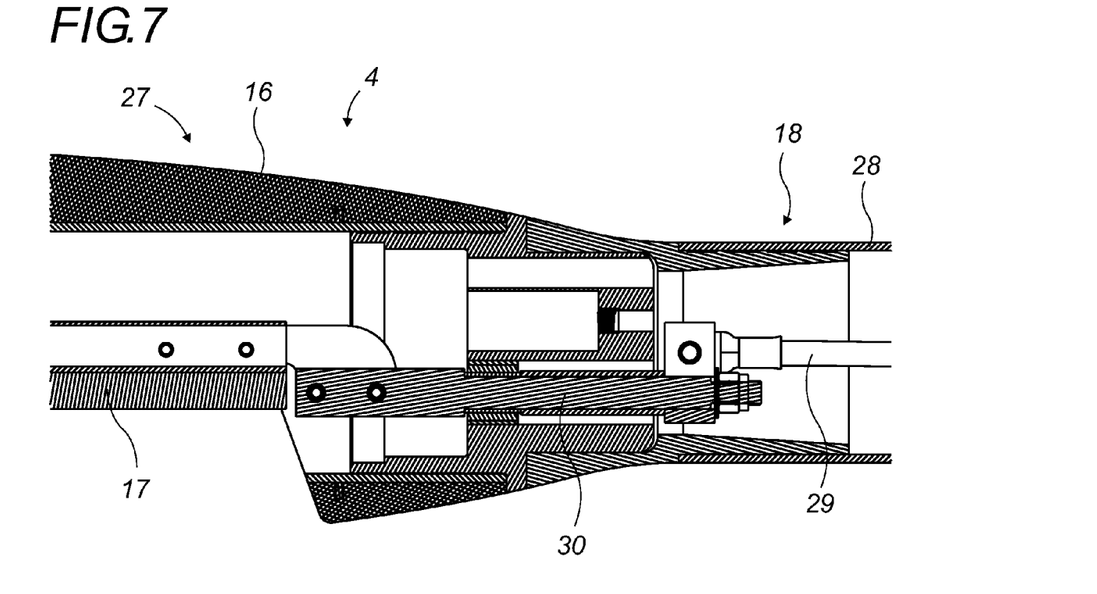
FIG. 7 is detailed longitudinal cross-section of the other end of the electrical power supply arm incorporating the means of assistance according to the invention.

The opposite end (27) of the arm (4) is a mechanical device designed to connect the articulation (12) linking the arm (4) to the post (5). It is a hollow mechanical component (28) accommodating an electrical power supply cable (28) providing, via an internal connection (30), the electrical link with the electrical power supply system on the post (5). This hollow component (28) is terminated with the pivoting articulation (12) slightly offset in relation to the post (5) so as to obtain a greater length for the arm because of the amplitude of the angular deviation movements at the end of the arm. This position is dependent on that of the post (5) in relation to the vehicle. The purpose is to have an arm sufficiently long for the angle that the arm can reach in relation to the power conductor rail in all the possible vertical deflections of the vehicle not to be too big.

The temporary contact and bearing component (19) of the arm (4) provided near the free end (25) of the arm (4) also contributes to the damper function.

The rolling or sliding device can, in effect, be mounted floating or suspended from the top towards the bottom in relation to the main structure of the arm (4)—for example, in the form of a damping device, preferably guided (not illustrated), that has an elastic resistance to depression in a progressive and dampened depression and with elastic return to an extension position, so as to ensure the necessary gentleness of making of contact and of rolling or sliding.

The travel lane (20) on which the temporary contact and bearing component (19) moves—for example, the roller (21)—is provided on the vehicle (1), positioned adjacent to the conductor rail (2). This is so that this rolling or sliding device existing at the end of the arm (4) can accompany and progressively assist the said arm (4) with its shoegear (17) during the movement of making of electrical contact with the conductor rail (2).

One can use, for instance, a part of the upper area (31) of the front (32) of the vehicle (1), such as illustrated in the Figures. This advantageously has a domed surface of which the convex concavity is designed for the desired progressiveness for the making of contact of the shoegear (17) with the conductor rail (2). This adjacent lane (20) can advantageously be provided on a cover (33) marrying, for example, the shape of the part of the upper area (31) providing protection to a component of the vehicle—for example, the compartment that accommodates the air conditioning system.

Figure 2:
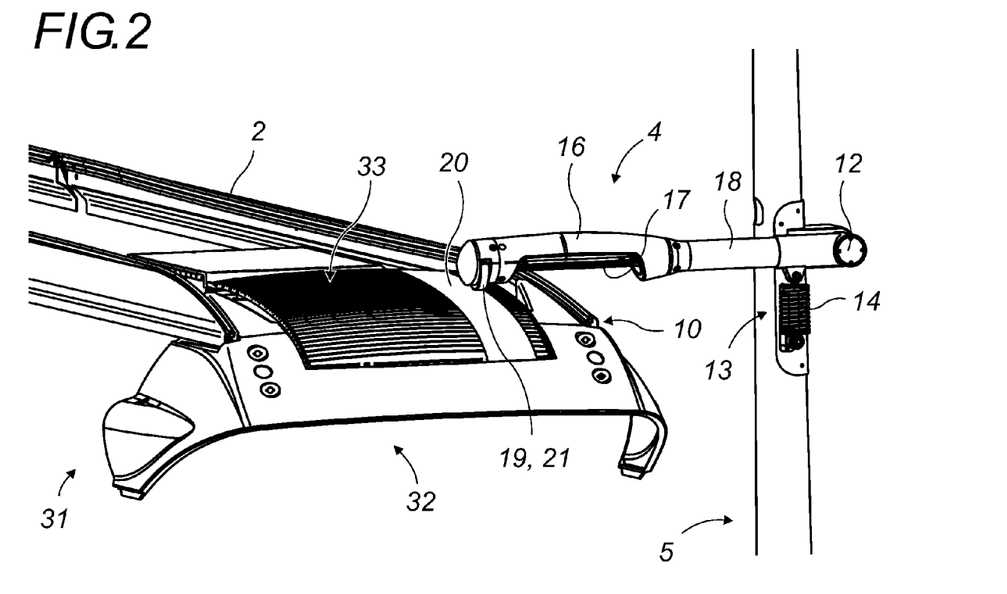
FIG. 2 is a detailed view in perspective, in relation to FIG. 1, centered on the front end of the vehicle, and on the entire electrical power supply arm incorporating the means of assistance according to the invention.
Figure 3:
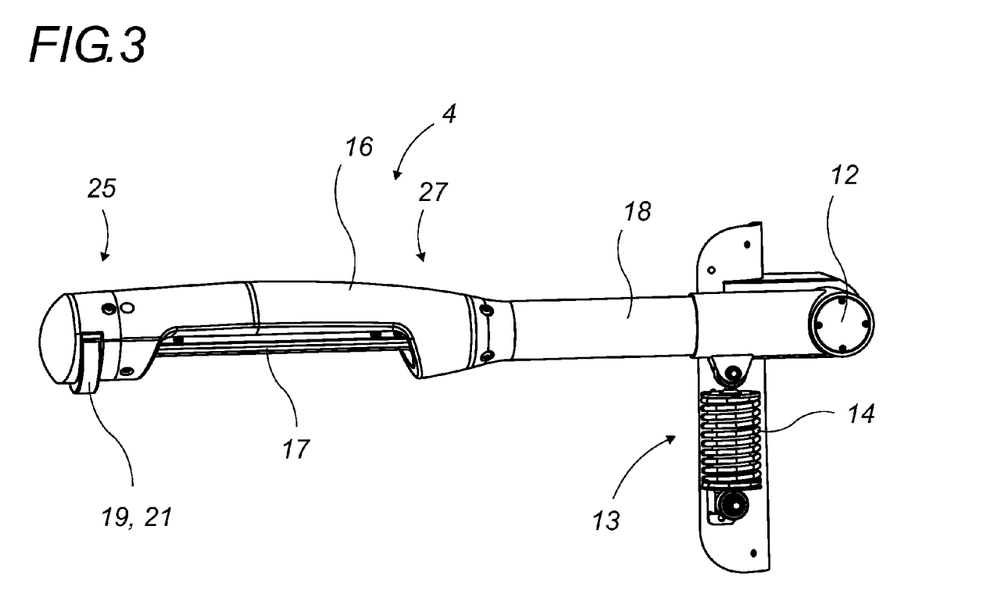
FIG. 3 is an overview of the electrical power supply arm incorporating the means of assistance according to the invention.
Figure 4:
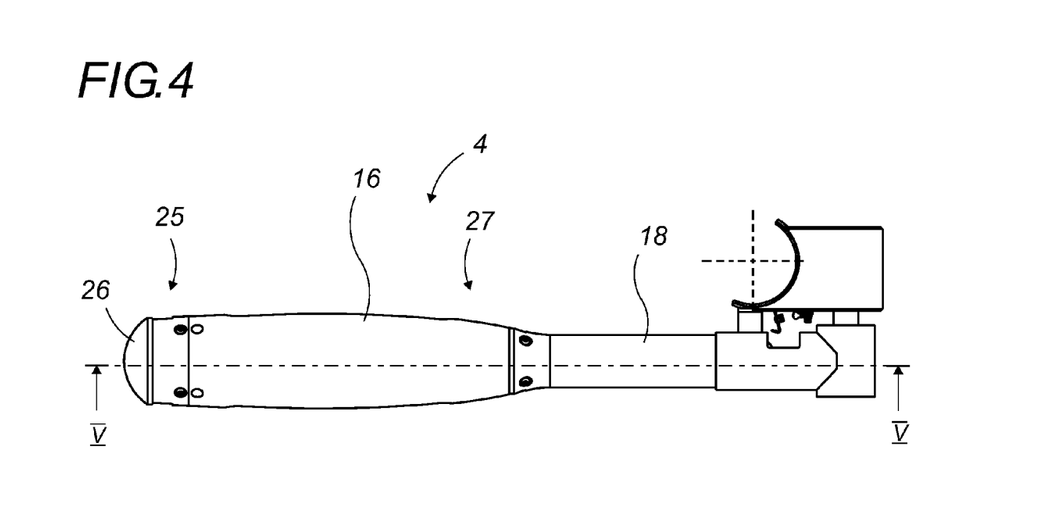
FIG. 4 is a top view of the electrical power supply arm incorporating the means of assistance according to the invention.
Figure 5:
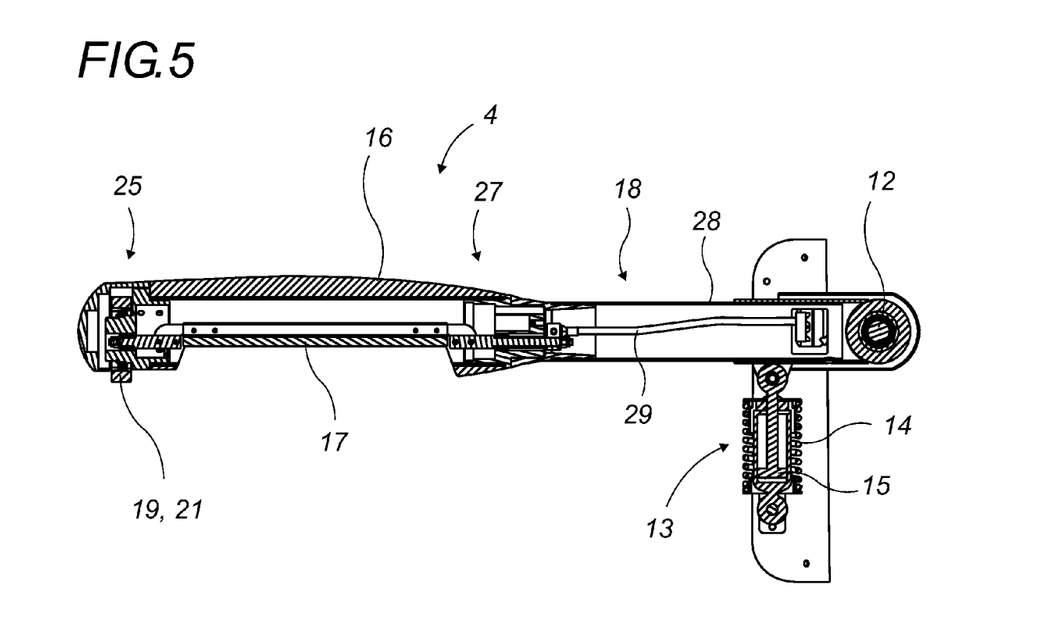
FIG. 5 is a longitudinal cross-section, according to line V-V, of FIG. 4 of the electrical power supply arm, incorporating the means of assistance according to the invention.
Figure 6:
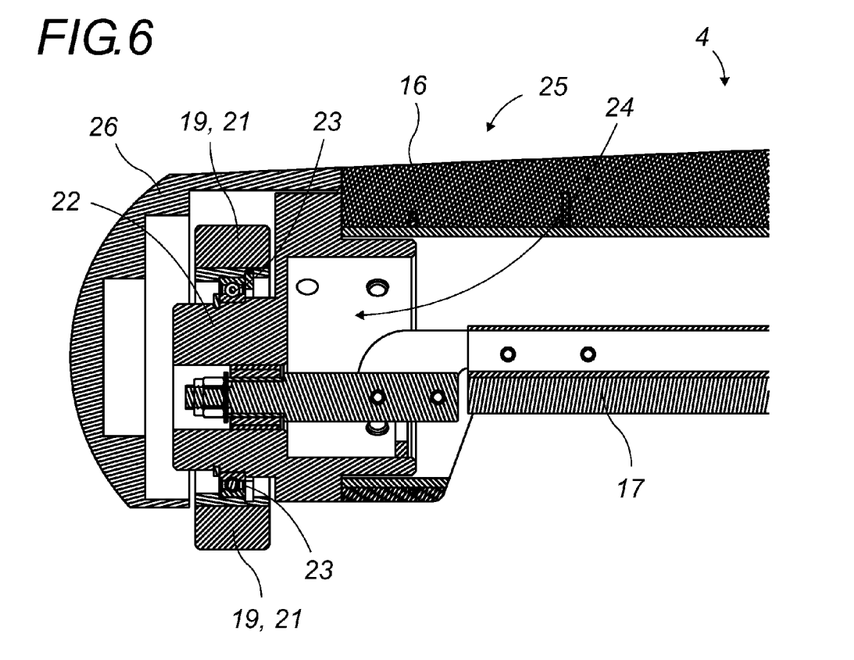
FIG. 6 is detailed longitudinal cross-section of the free end of the power supply arm incorporating the means of assistance according to the invention.

It is illustrated in FIGS. 1 and 2 in the form of a white strip.

The travel lane (20) is preferably mounted suspended on the vehicle (1) to filter the impact noises during the making of contact of the roller (21) or lug. The travel lane (20) constituting a ramp shape and the conductor rail (2) have appropriate shapes so that the load of the arm (4) temporarily supported by the roller (21) is progressively taken-up by the shoegear (17) sliding progressively and moving on the conductor rail (2).

The invention is not limited to one single conductor rail and to one single distributor arm. On the contrary, there can be two, to cater to the bi-directional functionality often required or, in the case of a vehicle on unguided tires, to implement the return of the current, which—in the case of a guided vehicle such as a tramway on tires—is implemented by the guide rail.

One can also envision a conductor rail on one side or on each of the sides of the vehicle, at an appropriate height for safety.

In this case, the principle remains the same even with a lateral arm (4). One simple provides a suitably-curved adjacent rail on which the means of assistance is carried and moves.

Figure 8:
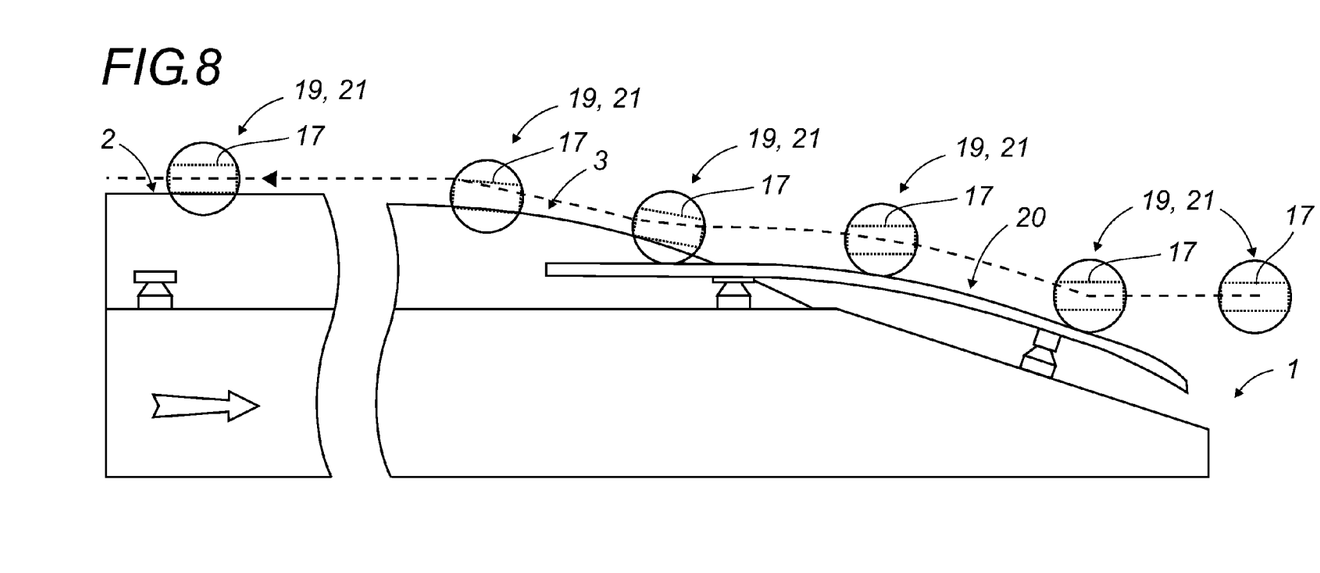
FIG. 8 is a partial view of one example of implementation of the power system as per the invention, in various positions during the arrival of the vehicle.
Figure 9:
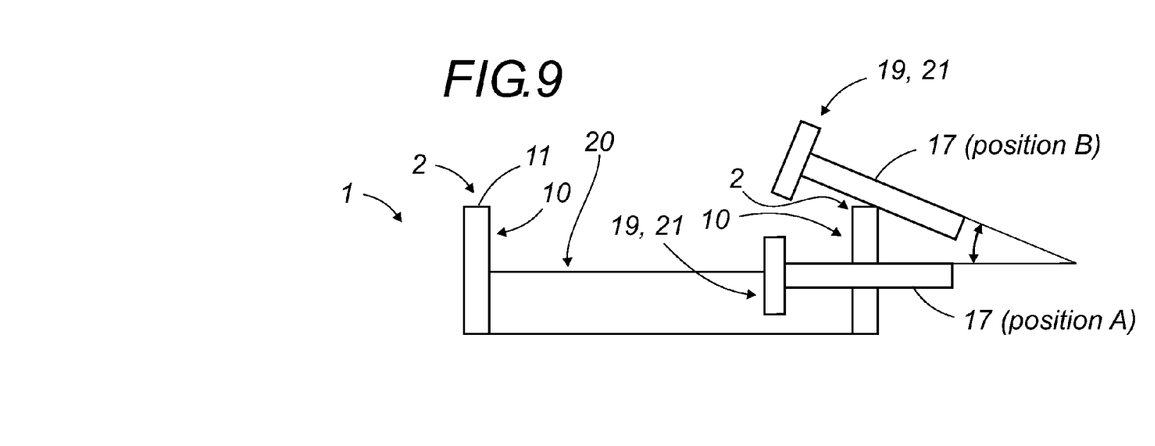
FIG. 9 is a schematic partial side view of the power system illustrated in FIG. 8.

The operation of the invention is relatively simple and can be illustrated, for example, by FIGS. 8 and 9.

FIG. 8 shows an example of implementation of the power supply system according to the invention, in which the travel lane (20) has the form of a curved ramp segment. The conductor rail (2) has, near the rear of the travel lane, a rising curve extended by an essentially-horizontal portion. FIG. 8 also shows a succession of positions of the roller (21), simulating the advance of the vehicle (1) in relation to the power supply system.

When the shoegear (17) rests on the upper surface of the conductor rail (2) with a perfectly-ensured electrical contact, the roller (21) is positioned beyond the rear end of the travel lane (20). Any mechanical contact between the roller (21) and the travel lane (20) or the roof of the vehicle (1) is impossible, therefore.

The same applies for a variant of implementation of the power supply system in accordance with the invention, in which the travel lane (20) extends as far as the rear of the vehicle (1). A sufficient elevation of the upper surface of the conductor rail (2) in relation to the travel lane (20) therefore prevents any risk of mechanical contact of the roller (21) with the said travel lane (20).

When the vehicle arrives at the distributor arm (4), the first making of contact occurs at the means of rolling or sliding (roller 21) with the travel lane (20), whether the arm (4) is upper and horizontal or lateral and vertical. This first making of contact will have the effect of slightly raising the distributor arm (4) and then, thanks to the suspension device of the arm (4), of maintaining it while rolling or pressing against the travel lane (20) at a height such that the shoegear (17) does not enter into contact with the conductor rail (2). This first making of contact is illustrated schematically in FIG. 9 by the position A of the shoegear (17).

Next will start a phase of progressive closening, at the end of which the shoegear (17) will become level with it until it ends-up tangent in electrical contact, and perfectly parallel at least locally as regards the contact with the upper surface of the conductor rail (2). This second making of contact is illustrated schematically in FIG. 9 by the position B of the shoegear (17).

Advantageously, the curved beginning of the conductor rail (2) is offset longitudinally to the rear in relation to the beginning of the travel lane (20), at a sufficient distance to allow an adequate elevation of the arm (4), thereby ensuring an optimal electrical contact and a gentle transition into mechanical contact. The mechanical contact, therefore, takes place without shock, from a mechanical contact between the roller (21) and the travel lane (20) to a mechanical contact between the shoegear (17) and the conductor rail (2).

This contact will be firm but gentle, because of the bearing force due to the dead weight of the arm relieved by the spring (14). Simultaneously, the rolling or sliding part of the assisting means of rolling or sliding will arrive at the end of its travel on the adjacent lane (20). The force of the spring (14) of the distributor arm (4) can then apply itself fully. This entire phase of making of contact will therefore take place progressively, briefly and gently.

The different implementation variants described allow the releasing of the rolling or sliding component from contact with the travel lane (20) as soon as the optimal electrical contact-making is accomplished. The means of assistance with electrical contact-making therefore remedies the disadvantages notably due to the shocks promoting the wearing and fragilization of the components of which the power supply system is composed.

The invention claimed is:

1. An electrical power system for an electrically-propelled vehicle with at least one electrical power distribution arm articulated on a post, with such posts being positioned at intervals along a road on which the vehicle is traveling; the said arm is electrically connected to an electrical power supply, and is equipped with an electrical contact component used as a shoegear on a longitudinal conductor rail carried by the vehicle, characterized in that the following is provided for the arm associated with the longitudinal conductor rail carried by the vehicle:

a part of the arm that assists with optimal making of electrical contact between the electrical contact component of the arm and the conductor rail carried by the vehicle and incorporates a temporary contact and pressure component;

a travel lane present on at least a part of a front upper section of the vehicle, and mounted to a roof of the vehicle adjacent to the conductor rail and extending over at least a portion of the length of the conductor rail, with the said temporary contact and pressure component bearing and moving on the said travel lane at the commencement of passing of the vehicle under the arm, before the electrical contact component bears on the said conductor rail.

2. The system according to claim 1, characterized in that the travel lane is a bearing ramp rising from a front to a rear of the vehicle.

3. The system according to claim 2, characterized in that the ramp has a curved shape.

4. The system according to claim 3, wherein the curved shape is a convex dome.

5. The system according to claim 1, characterized in that the travel lane is mounted on the vehicle by a suspension.

6. The system according to claim 1, characterized in that the travel lane extends over a limited length of the vehicle in relation to the length of the conductor rail, to release the temporary contact and bearing component from any contact with the vehicle when optimal electrical contact is established between the electrical contact component and the conductor rail.

7. The system according to claim 1, characterized in that the travel lane extends over the entire length of the conductor rail, which incorporates a progressive and sufficient elevation of the conductor rail's upper contact surface in relation to the said travel lane to release the said travel lane from the temporary contact and bearing component when optimal electrical contact is established between the electrical contact component and the upper contact surface of the conductor rail.

8. The system according to claim 1, characterized in that the arm is mounted on the post by an articulation connected to a suspension device of the arm.

9. The system according to claim 8, characterized in that the suspension device incorporates a load compensation spring and a damper.

10. The system according to claim 8, characterized in that the pivoting articulation of the arm on the post is offset transversally in relation to the vehicle, beyond the post.

11. An electrical power supply system according to claim 1, characterized in that the temporary contact and pressure component is positioned at the free end of the arm.

12. The electrical power supply system according to claim 1, characterized in that the temporary contact and pressure component is a rolling device that moves along the travel lane adjacent to the conductor rail.

13. The electrical power system according to claim 12, characterized in that the rolling device is carried on a roller bearing, in a dampened or floating manner, by the arm.

14. The system according to claim 12, wherein the rolling device is a wheel or roller.

15. The electrical power supply system according to claim 1, characterized in that the temporary contact and pressure component is a sliding device that moves along the travel lane adjacent to the conductor rail.

16. The electrical power system according to claim 15, characterized in that the sliding device is carried in a dampened or floating manner, by the arm.

17. The system according to claim 15, wherein the sliding device is a lug or shoe.

18. A power supply system according to claim 1, characterized in that the power supply system incorporates two electrical distribution arms, each coming into contact with a conductor rail existing on each of the longitudinal sides of the roof, or on each upper part of each side of the vehicle, with each arm being connected to one polarity of the vehicle's electrical power supply.

* * * * *